July 28, 1964   J. WEIZENBAUM   3,142,816
VEHICLE IDENTIFICATION DEVICE
Filed Jan. 22, 1962   4 Sheets-Sheet 1

INVENTOR.
JOSEPH WEIZENBAUM
BY
Samuel E. Turner
ATTORNEY

July 28, 1964     J. WEIZENBAUM     3,142,816
VEHICLE IDENTIFICATION DEVICE

Filed Jan. 22, 1962     4 Sheets—Sheet 2

*INVENTOR.*
JOSEPH WEIZENBAUM
BY
Samuel E. Turner
ATTORNEY

July 28, 1964   J. WEIZENBAUM   3,142,816
VEHICLE IDENTIFICATION DEVICE
Filed Jan. 22, 1962   4 Sheets-Sheet 3

INVENTOR.
JOSEPH WEIZENBAUM
BY
Samuel E. Turner
ATTORNEY

July 28, 1964 J. WEIZENBAUM 3,142,816
VEHICLE IDENTIFICATION DEVICE
Filed Jan. 22, 1962 4 Sheets-Sheet 4
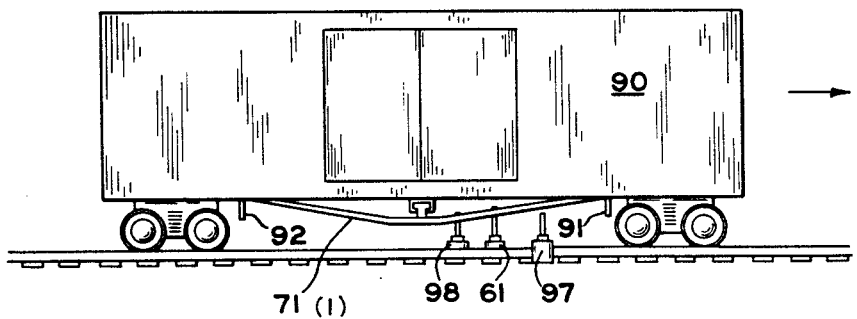
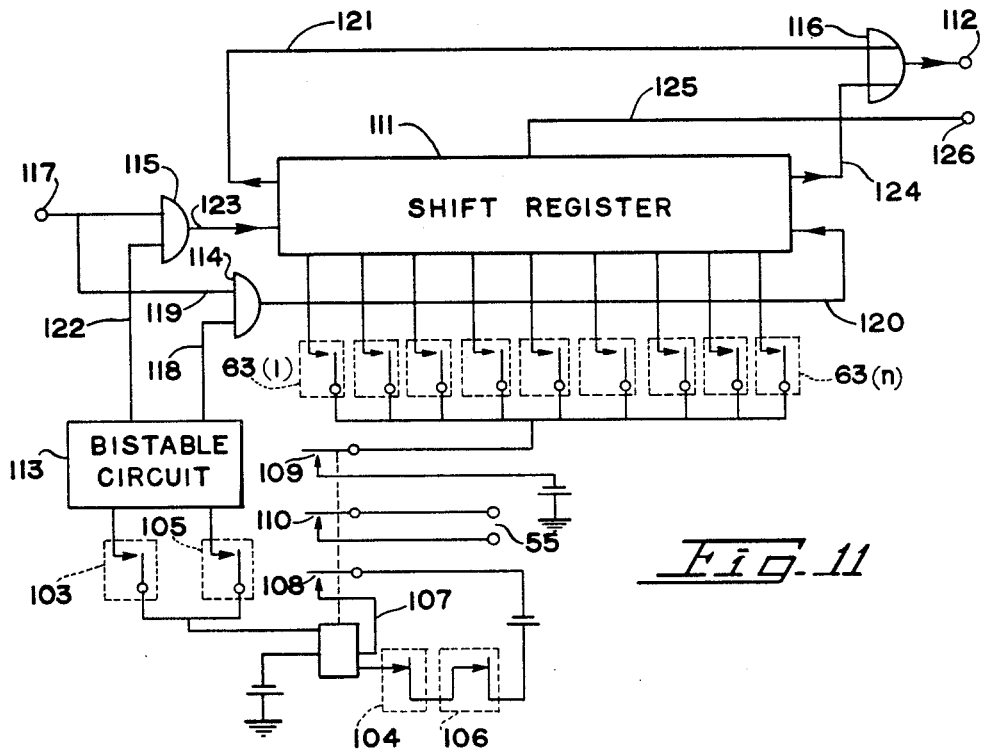
INVENTOR.
JOSEPH WEIZENBAUM
BY
*Samuel E. Turner*
ATTORNEY 3,142,816
VEHICLE IDENTIFICATION DEVICE
Joseph Weizenbaum, Palo Alto, Calif., assignor to General Electric Company, a corporation of New York
Filed Jan. 22, 1962, Ser. No. 167,797
3 Claims. (Cl. 340—31)

This invention relates to a vehicle identification system and particularly to a system which is adapted to provide a relatively large amount of information by which the vehicle may be routed and which may be fed to a data processing system for bookkeeping purposes.

Various systems have been proposed for detecting and identifying vehicles such as railway cars among which, for example, are magnetic and photoelectric systems. In a magnetic system magnetic members carried by the car are sensed as the car passes a sensing station along the way. It is clear that the magnetic members carried by the car must pass in close proximity to the sensing device and that variations in spacing between the two can cause improper operation of the system. In a photoelectric system extraneous light beams can cause false operation of the system. For example, light can be reflected into the photodetectors from portions of a passing car. Systems have been proposed wherein the vehicle carries a group of electrical contacts which engage stationary contacts positioned along the way. Such systems are adversely affected by weather conditions and contact corrosion. Furthermore, most prior art systems are not, as a practical matter, well adapted to providing large amounts of identifying information.

It is therefore an object of the invention to obviate the above-mentioned disadvantages of prior systems.

It is another object to provide an improved vehicle detection system.

Another object of the invention is to provide a simple mechanical feeler arrangement in a vehicle detection system.

Another object of the invention is to provide readily rearrangeable vehicle identification code members.

Another object of the invention is to sense the presence of a vehicle carrying identification information.

Another object of the invention is to condition a normally inoperative detection system upon sensing the presence of a vehicle carrying identification information.

Another object of the invention is to present information read from a vehicle to utilization apparatus in uniform order regardless of the orientation of the vehicle.

These and other objects of the invention are achieved in the automatic information sensing system of the present invention as applied to the identification of railway cars as follows: A code member carrier is mounted beneath the railway car and is adapted to carry a plurality of T-shaped code members arranged therealong in a pattern corresponding to the desired information. Sensing stations are located at chosen positions between the tracks and include a plurality of stiff wire sensing feelers or levers extending vertically for engagement with the code members carried by the car. Each sensing lever which engages a code member is rocked in the direction of motion of the car to close a respective electrical switch. In this way a combination of switches is closed corresponding to the information representing pattern and a group of storage devices are set accordingly.

As another feature of the invention the sensing levers may normally be held in a horizontal position to avoid engagement with and possible damage by the trucks of the cars. A car presence sensing arrangement is provided to bring the sensing levers into the operative position when a car carrying the identification device of the present invention is detected.

As a further feature of the invention the car presence sensing system provides an indication of the orientation of the car. This indication is used to control the sensing circuitry so that no restriction need be placed on the orientation of the car. That is, either end of the car may be the leading end thus allowing greater freedom in handling the cars.

The invention will be described in greater detail with reference to the accompanying drawings in which:

FIGURE 10 is a side view of a railway car passing over a sensing station; and

FIGURE 11 is a schematic diagram of a sensing circuit.

Figure 2:
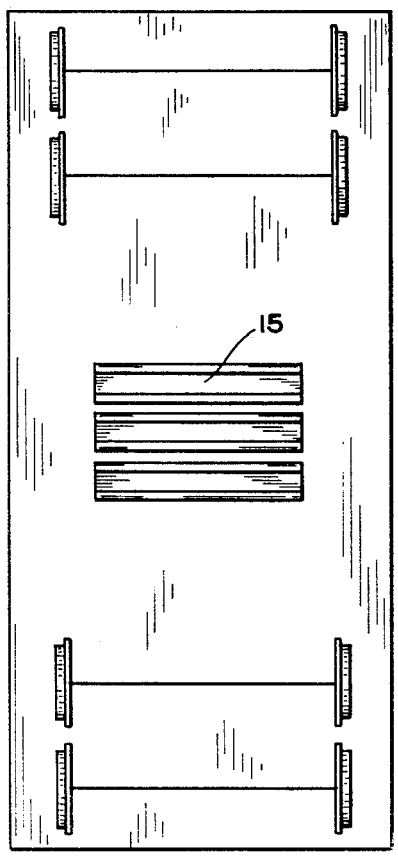
FIGURE 2 illustrates a plurality of code member carriers mounted beneath a railway car.
Figure 1:
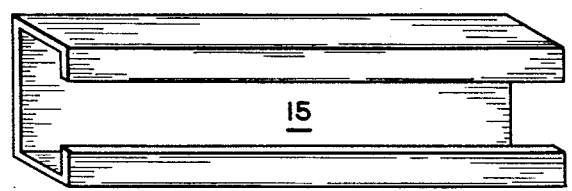
FIGURE 1 illustrates a code member carrier of the present invention.

Each car to be identified is fitted with at least one code member carrier. The code member carriers of the present invention may be formed of a simple channel as shown in FIG. 1 which illustrates a code member carrier 15. The carrier 15 is mounted beneath and transverse of a railway car to be identified as illustrated in FIG. 2. Also shown in FIG. 2 is the mounting of additional code member carriers where a greater amount of information is desired.

Figure 3:
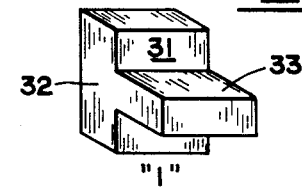
FIGURE 3 illustrates a T-shaped code member according to the present invention.

T-shaped code members are carried by the slotted carrier and are spaced therealong to form a pattern representative of the desired information. For example, the code members may be arranged to represent a desired identification number according to a predetermined binary code. The T-shaped code members are formed as shown in FIG. 3 which illustrates a code member 31. A body portion 32 is formed with appropriate dimensions to fit within the channel formed by the code member carrier 15 of FIG. 1. Extending from the body portion 32 is a tip 33 adapted to be engaged by sensing levers which are described hereinafter. Thus a plurality of code members 31 may be adjustably positioned in the carrier 15 to represent an identification number of the car.

Figure 4:
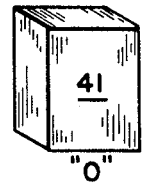
FIGURE 4 illustrates a spacer which may be used in positioning the code members.

In order to appropriately space the code members within the carrier, spacing members may be used. For example, a spacing member 41, shown in FIG. 4, may be placed in each position whereat a code member 31 is omitted. Thus the dimensions of the spacing member 41 are similar to those of the body portion 32 of the code member 31.

Figure 5:
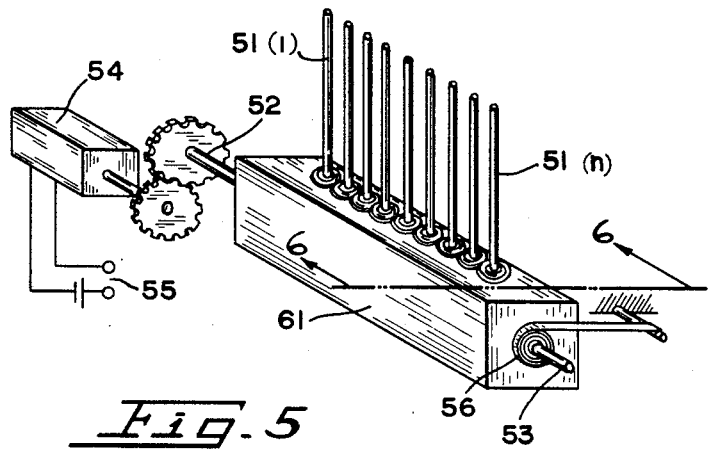
FIGURE 5 illustrates an array of sensing levers with an arrangement for driving the sensing levers from a horizontal to a vertical position.
Figure 8:
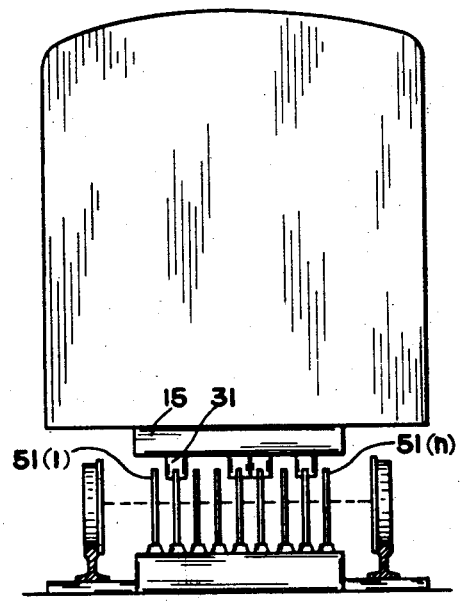
FIGURE 8 is an end view of a railway car passing over an enabled sensing station.

For detecting the information represented by the code members carried by a railway car there is provided a sensing station comprising a plurality of feelers or sensing levers 51(1)–51(n) mounted between the tracks of the way and extending vertically to engage the code members carried by the car when the car passes the sensing station as shown in FIGS. 5 and 8. A sensing lever is provided for each position which may be occupied by a code member. Thus as the car passes the sensing station the combination of code members engages a corresponding combination of sensing levers.

Figure 6:
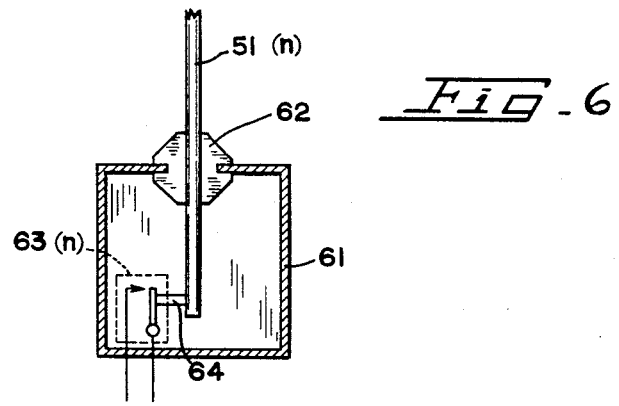
FIGURE 6 is a cross section view of the sensing lever mounting box illustrating a preferred arrangement for mounting the sensing levers and a sensing switch operable by a sensing lever.

The sensing levers are mounted in a protective container or box 61 shown in FIG. 5. The sensing levers are preferably supported in box 61 by a resilient ring or bushing 62 as shown in FIG. 6. The bushing 62 may be formed of rubber for example, which is preferably bonded to the sensing lever.

Mounted in the box 61 for cooperation with the sensing levers 51(1)–51(n) is a plurality of normally open switches 63(1)–63(n), FIG. 11. For example, as shown in FIG. 6, the switch 63(n) is positioned for cooperation with the sensing lever 51(n). A plunger 64 of switch 63(n) engages the lower portion of the sensing lever 51(n). Thus when lever 51(n) is engaged by a code member affixed to a passing car, the sensing lever 51(n) is rocked in the direction of motion of the car, that is, clockwise as shown in FIG. 6, about its mounting bushing 62 thereby momentarily closing the contacts of switch 63(n). In the above described manner a combination of the switches 63(1)–63(n) is closed according to the combination of code members carried by the car. The switches 63(1)–63(n) are connected in a sensing circuit shown in FIG. 11 which is described more fully hereinafter.

Figure 7:
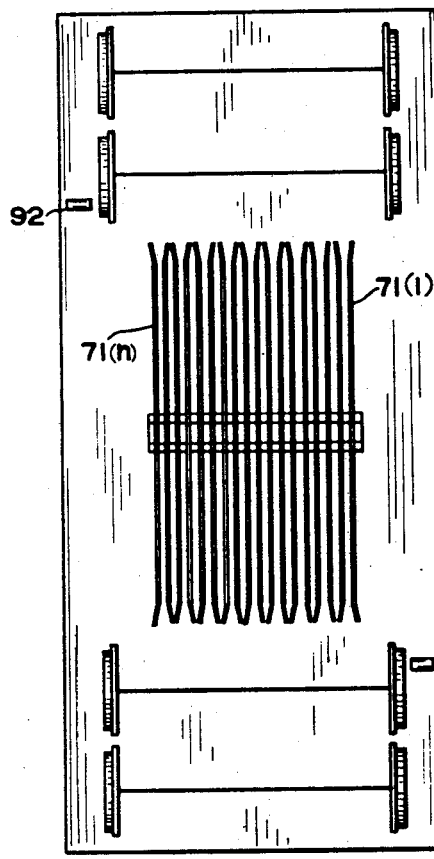
FIGURE 7 illustrates a plurality of guide channels for assuring proper alignment of the sensing levers with code member positions.

To ensure that the sensing levers pass the respectively corresponding code member positions, a plurality of guide channels 71(1)–71(n), FIG. 7, may be provided. Each of the channels is formed of a pair of substantially parallel members between which the sensing lever is guided. Each channel is flared at each end in order to ensure that the related sensing lever enters the channel. The guide channels are shaped and are mounted beneath the car as shown in FIG. 10 so as not to interfere with the ready removal and rearrangement of the code members in the code member carriers.

The sensing levers 51(1)–51(n) are preferably held in a horizontal position until the leading truck of the car has passed. The sensing levers must then be brought to a vertical or operative position to engage the code members carried beneath the car. It is desirable that the sensing levers then be returned to the horizontal position out of the way of the trailing truck of the car.

To accomplish the above action the box 61, FIG. 5, upon which the sensing levers are mounted, is fitted with a pair of stub shafts 52 and 53. These shafts are mounted in suitable bearings (not shown) between the tracks at the sensing station. The box 61 is continually urged in a clockwise direction of rotation by a resilient arrangement such as, for example, a coil spring 56. A stop arrangement, not shown, is provided to limit clockwise movement of the box 61 such that the sensing levers are normally held in a generally horizontal position.

To bring the sensing levers to a vertical or operative position an electric torque motor 54 is provided. The motor 54 is coupled through suitable gears to the shaft 52 and by this arrangement the motor 54 is operable to rotate the box 61 counter-clockwise until the sensing levers are in a substantially vertical position. At this position a stop arrangement, not shown, limits the counter-clockwise rotation and the stall torque of the motor 54 maintains the sensing levers in this vertical position as long as the motor is energized.

Figure 9:
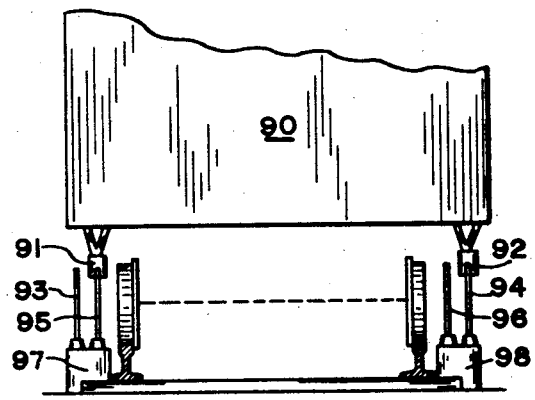
FIGURE 9 illustrates a car presence sensing arrangement.

To appropriately energize and de-energize the motor 54 there is provided a car presence sensing arrangement, the sensing elements of which are shown in FIG. 9. Carried beneath one edge of the car and toward one end thereof is a first car presence member 91. Carried beneath the other edge of the car and toward the opposite end is a second car presence member 92. For engagement with these car presence members there is provided a first pair of car presence levers 93 and 95 mounted at one side of the track and a second pair of car presence levers 94 and 96 mounted at the opposite side of the track. When the car is oriented as shown in FIG. 9 the presence member 91 engages the presence lever 95 and the presence member 92 engages the presence lever 94. If, however, the car were turned around, that is, if the car were oppositely oriented then the presence members 91 and 92 would engage the presence levers 96 and 93 respectively. As will become apparent, this arrangement allows the cars to be identified to be passed over the sensing station either end first.

Each of the presence levers 93–96 has associated therewith a respective switch 103–106, FIG. 11. The presence levers 93–96 and switches 103–106 are preferably mounted in protective boxes 97 and 98, FIG. 10, in a manner similar to the mounting of the sensing levers as described hereinbefore in connection with FIG. 6.

Assume now that a car 90 is passing the sensing station of the present invention in the direction as shown in FIG. 10. The car presence member 91 is toward the leading end of the car when the car 90 is thus oriented. The presence member 91 therefore engages the presence lever 95, FIG. 9, thus momentarily closing the switch 105, FIG. 11. Switch 105 is in the circuit of an operating coil of a relay 107. Thus the closing of the switch 105 causes operation of the relay 107 and a pair of contacts 108 thereof close to complete a holding circuit through a holding coil of the relay. A pair of contacts 109 also close to condition the sensing circuit for operation. A pair of contacts 110 also close thus completing a circuit via a pair of terminals 55 to the motor 54, FIG. 5. With the motor 54 thus energized the sensing levers 51(1)–51(n) are driven to the vertical or operative position as previously described.

The sensing levers then engage the code members carried by the car and the corresponding ones of the switches 63(1)–63(n) are momentarily closed. Each of the switches 63(1)–63(n) is connected to a shift register 111, FIG. 11, which is adapted to store the information read from the car. The shift register 111 may be any one of the well-known types comprising a plurality of bistable stages each having a set and reset state. Each of the switches 63(1)–63(n) is connected to a respective one of the bistable stages of the shift register 111. All of the stages of the shift register are initially in the reset state. Momentary closure of a combination of the switches 63(1)–63(n) causes a corresponding combination of the stages of the shift register 111 to assume their set states to thereby store the information read from the car. The information thus contained in the shift register 111 may then be transmitted to utilization units from an output terminal 112.

To accomplish this transmission, the information is shifted out of the shift register 111 in one direction or the other depending on the orientation of the car. By the provision of a bidirectional shifting control circuit the information is always sent to the utilization units in the same order, for example, lowest order first.

The bidirectional shifting control circuit includes a bistable circuit 113, a pair of AND gates 114 and 115 and an OR gate 116. The operation of the bidirectional shifting control circuit is as follows: When the switch 105 is momentarily closed as hereinbefore described it not only causes the actuation of the relay 107 but it also causes the bistable circuit 113 to assume its set state. In its set state the bistable circuit 113 arms the AND gate 114 over a lead 118. A series of shift pulses are received over a terminal 117 from one of the utilization units (not shown). These shift pulses are applied over a lead 119 to the AND gate 114 and thence over a lead 120 to the right end of the shift register 111. The information contained therein is thereby shifted to the left and out of the shift register over a lead 121 to the OR gate 116 by which the information is serially applied to the terminal 112.

Referring again to FIGS. 9 and 10, suppose the car 90 had approached the sensing station other end first, that is, with the car presence member 92 toward the leading end of the car and to the left hand side of the track as viewed in FIG. 9. In such a case the car presence member 92 engages the presence lever 93 which in turn momentarily closes the switch 103, FIG. 11. The switch 103 is in parallel with switch 105 as far as the relay 107 is concerned. Thus the relay 107 is actuated as before. However, the closure of switch 103 causes the bistable circuit 113 to assume its reset state thus arming the AND gate 115 over a lead 122 while the AND gate 114 is disarmed. The shift pulses from terminal 117 are now applied to the left end of the shift register 111 over a lead 123 thereby causing the information in the shift register to shift to the right and out of the shift register over a lead 124 to the OR gate 116 and thence to the output terminal 112.

In order that the shifting pulses may be applied to the terminal 117 at the proper time it is necessary to signal the utilization unit that information is stored in the shift register 111 ready for readout. This may be accomplished in various ways. For example, the identification numbers of the cars may be chosen such that the center code member position is always occupied by a code member. Consequently the center stage of the shift register 111 will then invariably be set when a car passes the sensing station. This set state may be detected by the utilization unit over a lead 125 and a terminal 126.

When the code members carried by a car have passed the sensing station and have been sensed it is desirable that the sensing levers be returned to their inactive or horizontal position before the passage of the trailing truck of the car. Assuming that the car 90 of FIG. 9 is moving in the direction indicated, then the car presence member 92 is toward the trailing end of the car. Thus the sensing levers 51(1)–51(n) engage the code members and sense the same before the presence member 92 engages the presence lever 94, FIG. 9. Engagement of the presence member 92 with the presence lever 94 causes the associated normally closed switch 104, FIG. 11, to open thus opening the holding circuit of the relay 107. This results in the opening of the contacts 110 in the power circuit of the motor 54, FIG. 5, thus allowing the sensing levers to be returned to their horizontal position by the influence of the spring 56.

In the event of the opposite orientation of the car 90, FIG. 10, the car presence member 91 is toward the trailing end of the car and to the right hand side of the track as viewed in FIG. 9. It therefore engages the presence lever 96 thus opening the associated switch 106, FIG. 11, which is in series with the holding circuit of the relay 107. Thus regardless of the orientation of the car the sensing circuit is deactivated and the sensing levers return to their horizontal position.

While the principles of the invention have been made clear in the illustrative embodiments, there will be obvious to those skilled in the art, many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications within the limits only of the true spirit and scope of the invention.

What is claimed is:

1. A system for sensing information carried by a vehicle comprising: a code member carrier attached to said vehicle and having a plurality of predetermined code member positions; an arrangement of code members positioned in said carrier to represent the desired information; a plurality of sensing levers mounted along the way of said vehicle for engagement with the code members carried by said vehicle; a plurality of electrical switches each adapted to be actuated when a respectively associated one of said sensing levers engages a code member carried by said vehicle; a shift register connected to said switches for storing a representation of the combination of said switches which are actuated by engagement of said sensing levers with the code members in said carrier; means for detecting the orientation of said vehicle; manifesting means for assuming a state indicative of the orientation of said vehicle; and means controlled by said manifesting means for shifting said representation stored in said shift register in a direction corresponding to the orientation of said vehicle.

2. A system for sensing information carried by a vehicle comprising: a code member carrier attached to said vehicle and having a plurality of predetermined code member positions; an arrangement of code members positioned in said carrier to represent the desired information; a plurality of sensing levers, one for each of said code member positions mounted along the way of said vehicle; means for normally holding said sensing levers in an inoperative position; means for sensing the presence of said vehicle for bringing said sensing levers to an operative position for engagement with the code members in said carrier; and means associated with said sensing levers and responsive to engagement of said sensing levers with said code members to manifest the information represented by said code members.

3. A system for sensing information carried by a vehicle comprising: a code member carrier attached to said vehicle and having a plurality of predetermined code member positions; an arrangement of code members positioned in said carrier to represent the desired information; a plurality of sensing levers, one for each of said code member positions mounted along the way of said vehicle; means for normally holding said sensing levers in an inoperative position; means for sensing the presence of said vehicle; means operable upon sensing the presence of said vehicle for bringing said sensing levers to an operative position for engagement with the code members in said carrier; means associated with said sensing levers and responsive to engagement of said sensing levers with said code members to manifest the information represented by said code members; and means operable subsequent to the engagement of said sensing levers with said code members for returning said sensing levers to said inoperative position.

References Cited in the file of this patent

UNITED STATES PATENTS

| | | |
|---|---|---|
| 847,157 | Brown et al. | Mar. 12, 1907 |
| 2,194,057 | Simpson | Mar. 19, 1940 |